United States Patent [19]

Gardner

[11] 4,450,925

[45] May 29, 1984

[54] WHEELED INDUSTRIAL/AGRICULTURAL TRACTORS

[75] Inventor: Peter C. Gardner, Stroud, England

[73] Assignees: H. Cameron Gardner Ltd.; Massey-Ferguson Services N.V., Curacao, Netherlands Antilles

[21] Appl. No.: 444,395

[22] PCT Filed: May 1, 1981

[86] PCT No.: PCT/GB81/00081
§ 371 Date: Dec. 21, 1981
§ 102(e) Date: Dec. 21, 1981

[87] PCT Pub. No.: WO81/03154
PCT Pub. Date: Nov. 12, 1981

[30] Foreign Application Priority Data

May 1, 1980 [GB] United Kingdom ............... 8014471

[51] Int. Cl.³ .................. B62D 21/18; B64F 1/22
[52] U.S. Cl. .................... 180/89.1; 172/98; 296/204
[58] Field of Search ............ 180/89.1, 22, 89.12, 180/900, 6.48; 280/29, 281 R, 795; 172/114, 98; 296/204

[56] References Cited

U.S. PATENT DOCUMENTS

| 1,843,422 | 2/1932 | Henry ................... 280/795 |
| 3,924,702 | 12/1975 | Heggen ................. 180/6.48 |
| 3,963,084 | 6/1976 | Misan .................. 180/89.1 |
| 4,124,079 | 11/1978 | Crow ................... 172/114 |
| 4,131,225 | 12/1978 | Baver et al. ........... 228/161 |
| 4,155,415 | 5/1979 | Lely ................... 180/89.1 |

Primary Examiner—Richard A. Bertsch
Attorney, Agent, or Firm—Robert L. Farris

[57] ABSTRACT

A wheeled industrial/agricultural tractor adapted for use as, for example, an aircraft tug. The tractor has an equipment support frame (3, 28) in the form of a heavy base plate (3) carried beneath an operator's station portion of a conventional tractor chassis (50, 10, 51, 52, 53) and a pair of transversely spaced struts (28) secured (25) to the front portion of the base plate (3) and arranged to extend forwardly thereof. The front ends of the struts have attachment means (19, 28a) for the support of equipment, such as a towing hitch (20), at the front of the tractor. First (1, 2, 70) and second (27, 29, 28c, 28d) attachment means are provided for respectively securing the base plate and struts to the chassis. The tractor also has an engine installation (10, 12, 13, 14) which allows downwardly sloping body panelling (16) at the front to improve vision of the front mounted equipment (20).

16 Claims, 7 Drawing Figures

WHEELED INDUSTRIAL/AGRICULTURAL TRACTORS

TECHNICAL FIELD

This invention relates to wheeled industrial/agricultural tractors and in particular to such tractors modified to carry equipment and perform duties not normally associated with such machines.

DISCLOSURE OF INVENTION

It is an object of the invention to provide a modified form of wheeled industrial/agricultral tractor which is suitable for use as an aircraft tug or to carry front mounted equipment.

Thus in accordance with the present invention there is provided a wheeled industrial/agricultural tractor having a chassis provided by a series arrangement of front axle support, engine block, transmission housing and back axle unit, the tractor being characterised by the provision of an equipment support frame in the form of a base plate carried beneath an operator's station portion of the chassis, and a pair of transversely spaced struts secured to the front portion of the base plate and arranged to extend forwardly thereof, the front ends of the struts having attachment means for the support of equipment at the front of the tractor, and in that first and second attachment means are provided for respectively securing the base plate and struts to the chassis.

In a tractor in accordance with the preceding paragraph by making the base plate of a substantial thickness (eg. 1" to 2" mild steel plate), the base plate not only forms part of the equipment support frame but also doubles as a ballast weight. This renders a tractor in accordance with the present invention particularly suitable for use as an aircraft tug since the necessary overall machine weight and desirable weight distribution can readily be achieved. When used as an aircraft tug a front equipment mounting plate carrying a front hitch may be attached to the front ends of the struts and a rear equipment mounting plate carrying a rear hitch may be attached to the rear portion of the base plate. In such an arrangement the pushing or pulling forces associated with the hitches are transmitted via the frame to the chassis.

In a preferred construction the base plate extends longitudinally from a location rearward of the rear wheels to a location in the vicinity of the junction between the engine block and transmission housing.

Transversely the base plate may extend over the full width of the tractor at certain locations with cut-outs to accommodate the rear wheels.

When a cab is fitted to the tractor this can be supported from the base plate and the base plate can form the floor of the cab.

The first attachment means preferably secure the base plate to the underside of a differential centre housing of the back axle unit, to the underside of the transmission housing, and to trumpet housings of the back axle unit.

The second attachment means comprises a transversely extending cross member which extends between the struts and is secured to the front axle support.

Alternatively the second attachment means may secure the struts to mounting points provided on the sides of the engine block.

It is a further feature of the present invention that the engine installation is arranged to enable body panelling over the front portion of the vehicle to provide good vision of any equipment mounted on the front of the tractor.

Thus, a radiator for engine cooling is disposed forwardly of the engine, the height of the radiator being less than that of the engine so that body panelling which covers the front portion of the tractor may extend from the front of the operators station in a downwardly sloping manner to give the improved forward vision referred to above.

As will be appreciated the above improved forward vision is of particular importance in a tractor for use as an aircraft tug. It has been found, by appropriate shaping of the above downwardly sloping body panelling arrangement to arrange that if the tractor is fitted, for example, with a front mounted NATO hitch with the inside of the top hitch jaw at the specified height of 30" from the ground, the top of the hitch pin will be clearly visible to the tractor driver as will also the front end of a standard 6" tow or shunt bar when lying on the ground with its rear end connected to the front hitch.

DESCRIPTION OF THE DRAWINGS

One construction of industrial/agricultural tractor according to the invention and specifically adapted for the towing and pushing of aircraft will now be described, by way of example only, with reference to the accompanying drawing in which.

BEST MODE OF CARRYING OUT INVENTION

Figure 1:
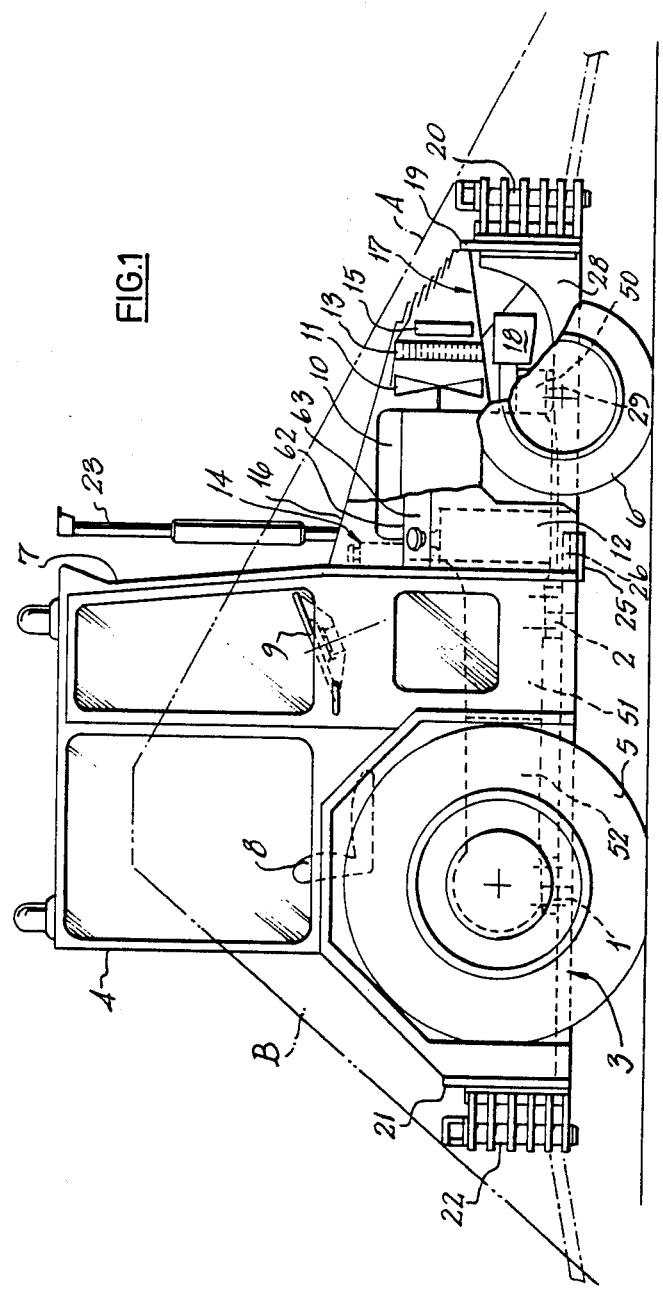
FIG. 1 is a schematic side view of the tractor with NATO hitches mounted front and back.
Figure 4:
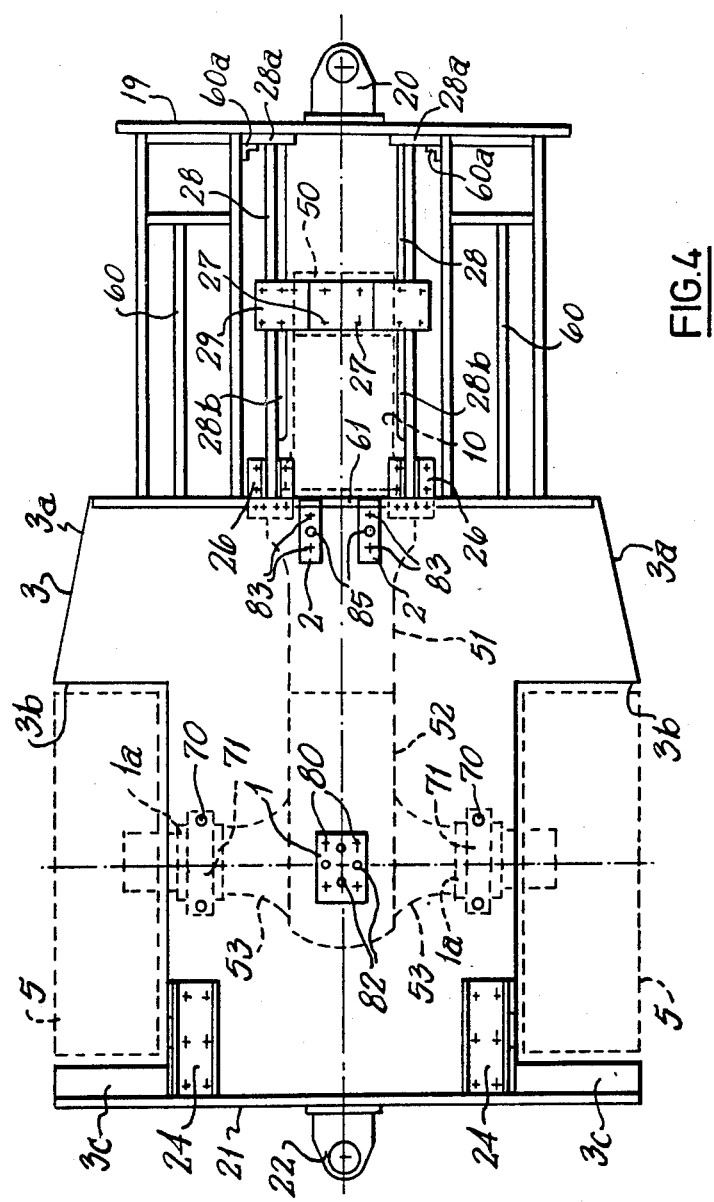

The tractor has the conventional chassis shown diagrammatically in FIGS. 1 and 4 provided by a series arrangement of a front axle support 50, an engine block 10, a transmission housing 51, and a back axle unit comprising a differential centre housing 52 and back axle trumpet housings 53.

Mounted under the operator's station portion of the chassis is a heavy base plate 3 (FIGS. 1, 3 and 4) which forms part of an equipment support frame and acts as a support for an operators cab 4.

The plate 3 is cut from, say, 1" or 2" mild steel plate dependant on the size and power of the tractor, and is rigidly attached below the tractor chassis by being bolted to the rear axle differential centre housing 52 using a wedge-shaped block 1 and to the transmission housing 51 using a pair of wedge-shaped blocks 2, as shown in more detail in FIGS. 3 and 4. Block 1 is secured to centre housing 52 by threaded studs passing through holes 80 in the block. The plate 3 is in turn secured to the block 1 by a second set of studs which extend through holes 81 and engage threaded holes 82 in block 1.

In a similar fashion blocks 2 are secured to the underside of transmission housing 51 by studs passing through holes 83 and the plate 3 is secured to each block 2 by studs which extend through hole 84 and engage threaded holes 85 in blocks 2.

The tapers, in a fore and aft direction, on blocks 1 and 2 are such that the base plate 3 is horizontal despite the use of smaller diameter rear wheels than in an agricultural application of the chassis.

Figure 5:
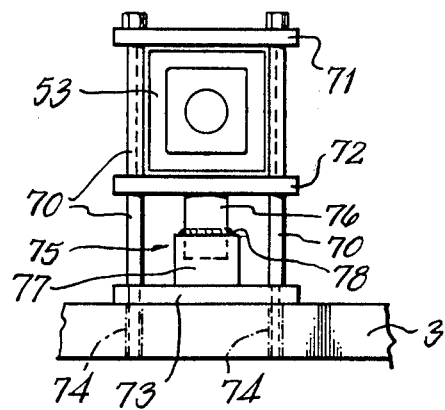
FIG. 5 shows the attachment of the equipment support frame to the back axle.

In addition, to the base plate 3 is also secured to the back axle trumpet housings 53 at the conventionally provided cab mounting points 1a by two pairs of bolts 70. As can be seen from FIG. 5, bolts 70 extend through holes in three metal straps 71, 72 and 73 and are screwed at 74 into tapped holes in the base plate 3. The straps 72 and 73 are held apart by a spacer 75 made from two rectangular section tubes 76 and 77 in telescopic relationship. The two tubes are welded together at 78 and during assembly, the overall length of the spacers 75 being adjusted prior to welding to correspond to the distance between the underside of cab mounting points 1a and the base plate 3 to take into account any inaccuracies in the casting of the back axle and any bow in the plate 3. It will be appreciated that the main attachment points of the plate 3 to the chassis are via blocks 1 and 2 and that bolts 70 whilst transmitting some load are primarily to stabilize plate 3 against sideways tipping relative to the chassis.

Rectangular portions 3b are cut away from the plate for the reception of the rear wheels 5 while leaving portions 3c to provide abutments for a rear equipment-mounting plate 21, typically 1" steel, which is bolted to the base plate 3 by means of double webbed support brackets 24. The sides of plate 3 are also cut away at the forward end of the plate to provide tapered formations 3a corresponding to the tapers 4a of the cab.

The equipment support frame is completed by a pair of transversely spaced struts 28 (which may have internal reinforcing webs 28b). A cross-member 29 extends between struts 28 and provides a mounting point for bolting the frame to the underside of the front axle pivot support 50 via holes 27. Struts 28 are secured to the plate 3 using angle brackets 26 which are welded to the struts and fixing plates 25 which are bolted to the front edge portion of the base plate via holes 25a. Cross member 29 is bolted to pads 29a which are welded to struts 28.

A front equipment mounting plate 19, typically of 1" steel, is bolted to the front ends of struts 28 using flange plates 28a which are welded to the struts 28. Reinforcing gussets (not shown) may be provided to strengthen the attachment of the plates 28a to the struts. Front and rear NATO hitches 20 and 22 are bolted to the mounting plates 19 and 21 respectively. The plate 19 includes headlight apertures 19a through which headlights secured behind the plate 19 can shine.

Figure 3:
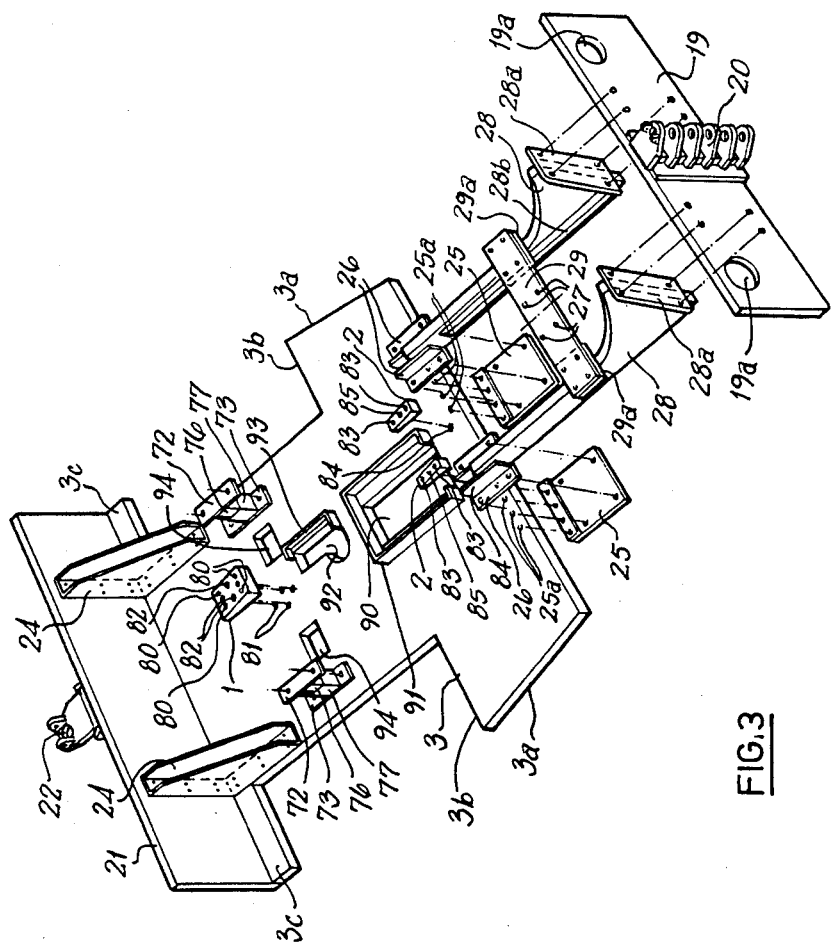
FIGS. 3 and 4 are, respectively, exploded perspective and plan views of an equipment support frame employed on the tractor showing front and rear equipment mounting plates carrying the hitches.

As can be seen from FIG. 3, the base plate 3 includes a number of apertures. A first relatively large aperture 90 is positioned below the transmission housing 51 to allow removal of an access plate on the bottom of the transmission housing and to enable various drain plugs on the transmission housing to be removed. A low wall 91 surrounds aperture 90 to assist in preventing oil from draining onto the top of base plate 3. A second aperture 92 is provided beneath an access plate and drain holes on the centre housing 52. Again a low wall 93 assists in preventing oil draining onto the top of the base plate. The remaining pair of apertures 94 receive the downwardly extending lugs (not shown) conventionally provided on the back axle trumpet housings 53 for the mounting of draft links in an agricultural application of the chassis. Apertures 94 enable the trumpet housings to be rotated sufficient about their longitudinal axes after unbolting from the centre housing 52 to allow the lugs to clear the apertures 94 so that the trumpet housings can then be withdrawn in an axial direction to give access to rear wheel brakes which are housing within the inner ends of the trumpet housings.

As will be appreciated the pushing and pulling forces experienced by the hitches 20 and 22 are transmitted via the frame constituted by the base plate 3 and struts 28 to the chassis in a controlled manner thus avoiding stress concentrations of an unacceptably high level in the chassis. Also the base plate 3 serves as a means of adding weight to the tractor, the desirable weight distribution of the vehicle as a whole being approximately two thirds on the rear wheels 5 and one third on the front wheels 6.

Another feature of the invention is the provision of good visibility from the cab. As will be seen from FIG. 2, since the cab tapers only slightly at 4a a substantially full-width windscreen 7 is povided. This provides good forward visibility. The driver's seat 8 and steering wheel 9 are located in the usual positions, as are also the engine 10 and cooling fan 11. However, the the fuel tank 12 is designed to fit under the rear portion of the offside front wing 16a of the tractor and a cross-flow radiator 13 of less height than the engine 10 is mounted in front of the fan 11.

Figure 7:
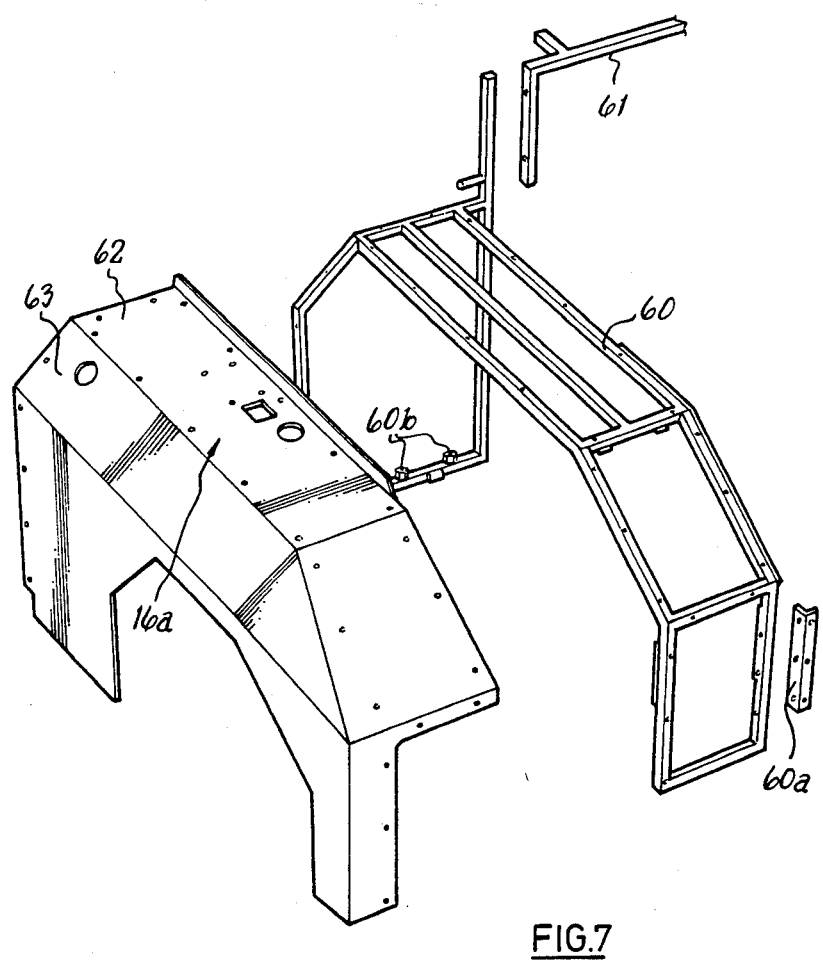
FIG. 7 is an exploded view of a front wing and associated support sub frame used in the tractor.

The front portions of wings 16a are supported by subframes 60 constructed from, for example, 1" square tubing. These sub-frames, which are located underneath the wings, are shown in FIGS. 4 and 7 and are bolted or otherwise secured at the front by angle brackets 60a to plates 28a. The rear ends of sub-frames 60 extend above and are bolted to the front edge portion of base plate 3 at 60b. One or more bracing pieces 61 interconnect the sub-frames across the front of the cab. An expansion tank 14 is provided above the rear end of the engine in order to provide for the proper filling of the cooling system.

As the vehicle illustrated is fitted with an automatic transmission system a cooler 15 is provided for the transmission oil, such cooler being arranged immediately forward of the radiator 13.

The above engine installation enables the engine bonnet 16 to slope forwardly and downwardly from the windscreen 7 so that at its forward end it lies closely above the top of the engine 10, fan 11, radiator 13 and transmission oil cooler 15, whereby the forward sight-line indicated by broken lines A, which includes the top of the front hitch pin, is considerably improved as compared with what it would be with the fuel tank located in its normal position above the engine 10 and with the usual radiator of greater height than the engine.

In order to provided for adequate cooling of the engine, air ducting 17 is provided so that the fan draws only cool air over the transmission oil cooler 15 and radiator 13. An air compressor or hydraulic pump 18 is shown which is driven from a forward extension of the engine crankshaft.

Figure 2:
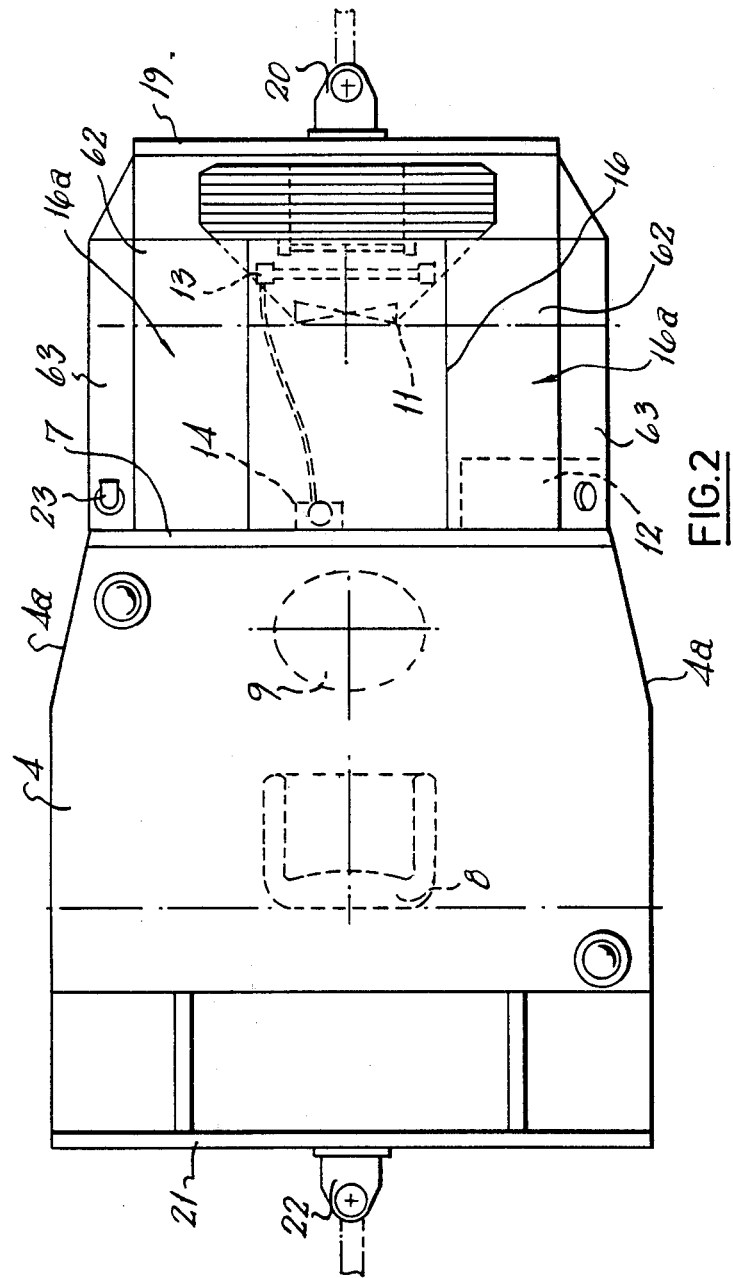
FIG. 2 is a plan view of the vehicle illustrated in FIG. 1.

It will be seen from FIG. 2 that the bonnet 16 of the vehicle is narrow and is flanked by the front wheel fenders or wings 16a so that the total width of the front portion of the tractor is substantially the same width as the cab. Each wing has an inner generally horizontal portion 62 and an outer downwardly sloping portion 63. This again promotes good forward visibility either side of the higher bonnet. In order to improve still further the forward vision of the driver of the vehicle, the exhaust pipe is arranged to extend laterally and substantially horizontally from the manifold to the nearside of the bonnet where it is turned vertically upwards, as indicated at 23, alongside the adjacent down member of the cab 4 so as not to interfere with the forward vision of the driver.

The rearward sightline, which includes the top of the rear hitch pin, is shown at B in FIG. 1.

Figure 6:
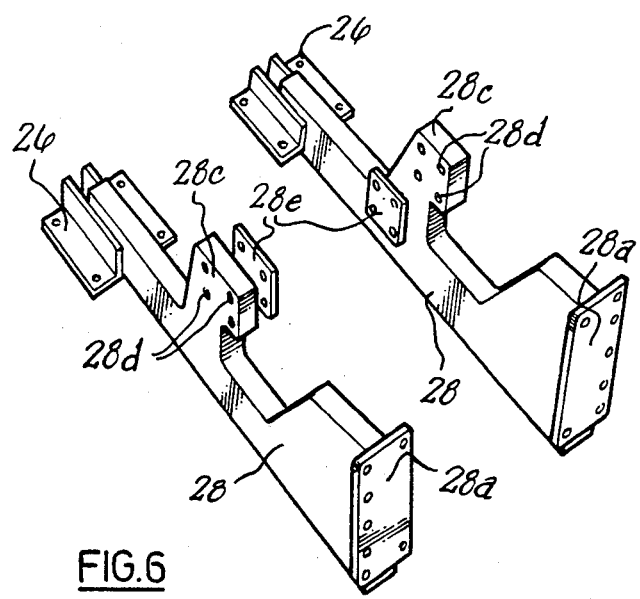
FIG. 6 shows an alternative form of front strut for use in an equipment support frame embodying the invention.

FIG. 6 shows an alternative form of strut 28 which is provided with an engine block attachment pad 28c having holes 28d through which the strut is secured by studs (not shown) and spacing piece 28e to an attachment point cast into the side of the engine block 10. When utilizing this alternative strut construction cross member 29 is eliminated and each strut is simply secured to the adjacent side of the engine block.

Although the invention has been described above in relation to an aircraft tug adaption, for which use the equipment support frame and good forward and rearward visibility are particularly suited, it will be appreciated that alternative industrial/agricultural equipment could be mounted on the support frame in place of hitches 20 and 22. For example, sweeping equipment could be mounted on the plates 19 or 21 and one or other of the hitches could be replaced by a winch.

I claim:

1. A wheeled industrial/agricultural tractor having a chassis provided by a series arrangement of front axle support, engine block, transmission housing, and back axle unit, the tractor being characterised by the provision of an equipment support frame (3, 28) in the form of a base plate (3) carried beneath an operator's station portion of the chassis (50, 10, 51, 52, 53), and a pair of transversely spaced struts (28) secured (25) to the front portion of the base plate (3) and arranged to extend forwardly thereof, the front ends of the struts having attachment means (19, 28a) for the support of equipment (20) at the front of the tractor, and in that first (1, 2, 70) and second (27, 29:28c, 28d) attachment means are provided for respectively securing the base plate and struts to the chassis.

2. A tractor according to claim 1 characterised in that the base plate (3) extends longitudinally from a location rearward of the rear wheels (5) of the tractor to a location in the vacinity of the junction between the engine block (10) and transmission housing (51).

3. A tractor according to claim 1 or claim 2 characterised in that the base plate (3) extends over the full width of the tractor at certain locations with cut-outs (3b) to accommodate the rear wheels (5).

4. A tractor according to claim 1 characterised in that a front equipment-mounting plate (19) is attached (28a) to the front ends of the struts (28).

5. A tractor according to claim 1 characterised in that a rear equipment-mounting plate (21) is attached (24) to the rear portion of the base plate (3).

6. A wheeled industrial/agricultural tractor having a chassis provided by a series arrangement of front axle support, engine block, transmission housing, and back axle unit, the tractor being characterised by the provision of an equipment support frame (3,28) in the form of a base plate (3) carried beneath an operator's station portion of the chassis (50,10,51,52,53) and a pair of transversely spaced struts (28) secured (25) to the front portion of the base plate (3) and arranged to extend forwardly thereof, the front ends (28a) of the struts supporting a front mounting plate (19) which carries a front hitch (20) and in that first (1,2,70) and second (27,29:28c, 28d) attachment means are provided for respectively securing the base plate and struts to the chassis whereby pushing and pulling forces associated with the front hitch are transmitted via the frame (3,28,29,28c) to the chassis (50,10,51,52,53).

7. A tractor according to claim 6 characterised in that the first attachment means (1, 2, 70) secure the base plate (3) to the underside of a differential centre housing (52) of the back axle unit, to the underside of the transmission housing (51), and to trumpet housings (53) of the back axle unit.

8. A tractor according to claim 6 characterised in that the second attachment means (27, 29) comprises a transversely extending cross-member (29) which extends between the struts (28) and is secured (27) to the front axle support (50).

9. A tractor according to claim 6 characterised in that the second attachment means (28c, 28d) secures the struts (28) to mounting points provided on the sides of the engine block (10).

10. A tractor according to claim 6 characterised in that the equipment support frame carries a sub-frame structure (60) for the support of front wheel wings (16a).

11. A tractor according to claim 6 characterised in that the base plate (3) serves as a mounting platform for a cab (4).

12. A tractor according to claim 11 characterised in that the base plate (3) forms the floor of the cab (4).

13. A tractor according to claim 12 characterised in that a radiator expansion tank (14) is fitted above the rear portion of the engine (10) under the body panelling (16).

14. A tractor according to claim 6 characterised in that a radiator (13) for engine cooling is disposed forwardly of the engine (10), the height of the radiator being less than that of the engine, and in that body panelling (16) which covers the front portion of the tractor extends from the front of the operators station in a downwardly sloping manner to improve vision of the front hitch (20) carried by the struts (28).

15. A tractor according to 14 or 13 characterised in that a fuel tank (12) is fitted under the rear portion of a front wing (16a) to same height at the front of the tractor.

16. A wheeled industrial/agricultural tractor for use with a front mounted hitch, the tractor having a chassis provided by a series arrangement of front axle support, engine block, transmission housing and back axle unit and being characterised by the provision of an equipment support frame (3, 28) in the form of a base plate (3) carried beneath the operator's station portion of the tractor chassis (50, 10, 51, 52, 53) and a front mounting plate (19) suitable for carrying the hitch (20) rigidly connected (28, 28a) with the base plate (3) whereby pushing and pulling forces are transmitted from the front mounting plate to the base plate.

* * * * *